United States Patent [19]

Howell et al.

[11] 4,424,263

[45] Jan. 3, 1984

[54] INTERCELL FLAME ARRESTOR FOR A BATTERY VENTING AND FILLING MANIFOLD

[75] Inventors: Gregory L. Howell, Anderson; Oscar H. Smith, Muncie; Don G. Townsend, Anderson, all of Ind.

[73] Assignee: General Motors Corporation, Detroit, Mich.

[21] Appl. No.: 334,156

[22] Filed: Dec. 24, 1981

[51] Int. Cl.³ .............................................. H01M 2/12
[52] U.S. Cl. ........................................ 429/88; 429/63; 429/73
[58] Field of Search ................... 429/88, 86, 63, 78, 429/73, 87

[56] References Cited

U.S. PATENT DOCUMENTS

| | | | |
|---|---|---|---|
| 4,008,355 | 2/1977 | Perkams | 429/63 |
| 4,087,592 | 5/1978 | Okazaki et al. | 429/63 |
| 4,117,205 | 9/1978 | Kitai | 429/86 |

*Primary Examiner*—Charles F. LeFevour
*Attorney, Agent, or Firm*—Douglas D. Fekete

[57] ABSTRACT

A flame arrestor for a battery manifold through which gases are vented from cells and liquid is occasionally pumped to replenish electrolyte in the cells comprises two chambers connected by a liquid trap. The trap is connected to each chamber such that liquid tends to drain from the chamber into the trap and thereby seals the trap. The liquid seal suppresses any flame attempting to propagate through the manifold. Gas buildup in the manifold displaces liquid from the trap into the downstream chamber, whereupon gas flows through the chamber for venting and the liquid is returned to the chamber to reform the seal.

3 Claims, 3 Drawing Figures

INTERCELL FLAME ARRESTOR FOR A BATTERY VENTING AND FILLING MANIFOLD

BACKGROUND OF THE INVENTION

This invention relates to a battery wherein cells are connected to a manifold through which battery gases are vented and alternately through which liquid is pumped for replenishing the cells. More particularly, this invention relates to a flame arrestor incorporated into the manifold for suppressing an explosion attempting to pass therethrough.

Over the life of a lead-acid battery, water is periodically added to the cells to replenish the electrolyte for losses due to electrolysis. A convenient method for filling the cells is by pumping water through a manifold connecting them. After filling, the manifold may be purged of water and utilized for venting electrolytic gases during battery operations. Because the gases are explosive, flame arrestors are required in the manifold to prevent an explosion in one cell from spreading through the manifold and damaging other cells. However, flame arrestors heretofore available have not been satisfactory because they restrict water flow and thus interfere with one of the main purposes of the manifold.

Therefore, it is an object of this invention to provide a flame arrestor construction for incorporation into a manifold of the type connecting a plurality of battery cells for venting electrolytic gases and alternately for adding water to replenish the electrolyte, which flame arrestor suppresses a gaseous explosion attempting to spread through the manifold without significantly hindering the flow of gas or liquid therethrough. The construction causes residual replenishment liquid to form a seal when the manifold is cleared after cell filling. The seal is temporarily interrupted by the buildup of gas pressure in the manifold to allow gas flow for venting, but has sufficient inertia to quench any explosive flame prior to venting.

BRIEF SUMMARY OF THE INVENTION

In a preferred embodiment, a flame arrestor of this invention is incorporated into a battery filling and venting manifold between two cells and comprises two chambers interconnected by a downwardly looped liquid trap. One chamber has an upper connection to the first cell and the other chamber has a similar upper connection to the second cell. Thus, the fluid flow path between the cells is through the chambers and trap. The trap is adapted to retain and to be sealed by a relatively small quantity of water. The chambers have a relatively large volume and flow-path cross section in comparison to the trap and are adapted to receive and temporarily hold water displaced from the trap by gas flow through the flame arrestor, but to drain water into the trap in the absence of gas flow. The two chamber construction permits gas flow in either direction.

The chambers and liquid trap readily conduct water for cell filling. After filling, excess water is pumped from the manifold, which is followed by gas flow. The gas flow empties the upstream chamber and clears the liquid trap. However, the downstream chamber retains sufficient water despite the gas flow to seal the trap after the manifold is cleared.

Water in the trap temporarily blocks the flow of gas through the manifold from the first cell to the second. As gases accumulate in the manifold adjacent the first cell, the pressure increases and forces water from the trap into the chamber remote from the first cell. When sufficient water is displaced, the seal is interrupted and a burst of gas flows through the manifold for venting. The water is retained in the chamber during the burst and then quickly drains back into the trap to reform the seal. Indeed, it is believed that gas flow and resealing occur substantially concurrently so that the gas flow path is always obstructed by some water. The water seal acts as a firebreak. When gases near the first cell are ignited, the flame propagates through the manifold to the water in the trap. Although the flame is accompanied by an increase in gas pressure sufficient to break the seal, the water has sufficient inertia to contain and put out the flame prior to venting. Thus, the flame arrestor of this invention safely vents the gases without allowing the flame to spread.

DETAILED DESCRIPTION OF THE INVENTION

Figure 1:
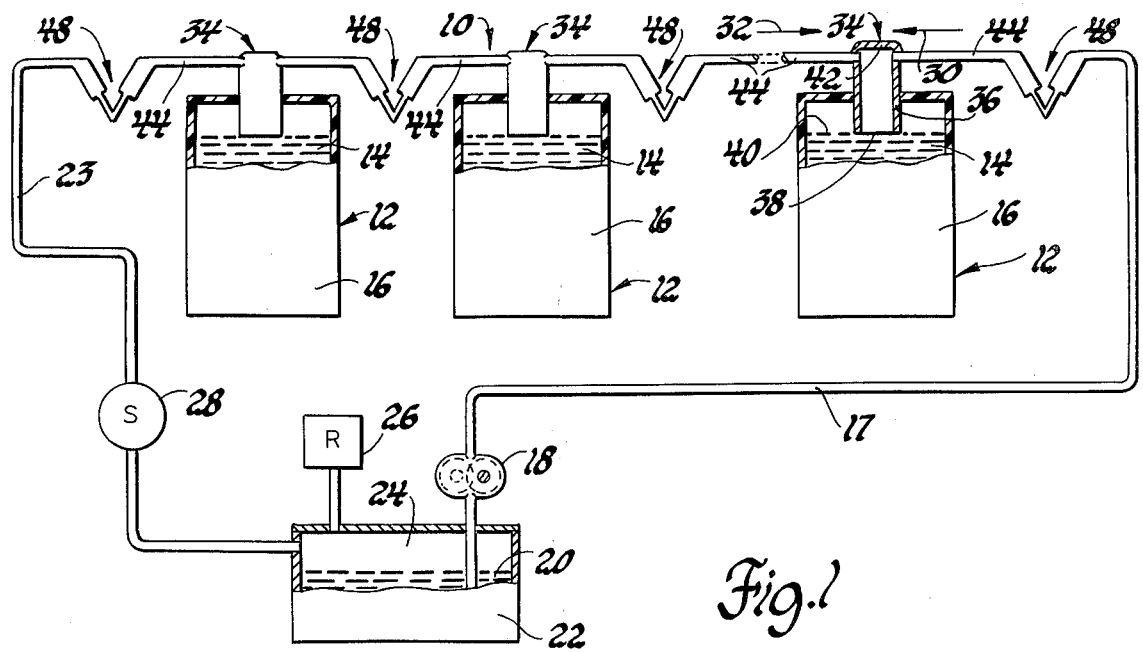
FIG. 1 is a schematic view of a battery having a filling and venting manifold that comprises the flame arrestor of this invention.

Referring to FIG. 1, a preferred manifold assembly 10 connects a plurality of battery cells 12, in series, for periodically replenishing electrolyte and venting gases. Each cell 12 comprises a discrete water-base electrolyte body 14 in a sealed container 16.

Manifold 10 is connected at one end through tube 17 to a reversible pump 18 for pumping water 20 from a reservoir 22 for cell filling. Reservoir 22 lies below cells 12 to prevent siphoning. Manifold 10 is connected at the other end through tube 23 to a gas space 24 above water 20 in reservoir 22 and is thereby vented to the atmosphere through a catalytic reformer 26. A liquid sensor 28 is provided between gas space 24 and cells 12. Pump 18 is actuated periodically to pump water 20 through manifold 10 in the direction of arrow 30 to fill cells 12. Water reaching sensor 28 indicates that all cells 12 are filled, whereupon pump 18 is reversed to draw excess water from manifold 10 in the direction of arrow 32. As the excess water is returned to reservoir 20, it is replaced in manifold 10 by gas drawn from space 24.

Manifold 10 is connected to cells 12 through filling devices 34, comprising a vertical tube 36 extending through the top of container 16. Tube 36 has an open bottom end 38 at the desired filling level 40 of electrolyte 14 and a closed top end 42. Two tubes 44 perpendicularly and diametrically intersect vertical tube 36 above container 16. The inner diameter of tubes 44 is three to five times smaller than the inner diameter of tube 36. Preferably, tubes 44 are ⅛ inch inner diameter (I.D.) and tube 36 is ½ inch I.D.

Immediately after cells 12 are recharged, pump 18 pumps water 20 in direction 30 through the manifold to the first filling device 34. The water flows downwardly in tube 36 to replenish electrolyte 14. Displaced gas escapes through the opposite tube 44. When electrolyte 14 reaches level 40, container 16 is full. Tube end 38 is sealed by the liquid so that gas cannot escape and more water cannot be added. Water then fills tube 36 and flows into the opposite tube 44 to the second cell in series. The second cell is then filled in the same manner, whereupon water flows to the next cell, and so forth.

When all cells are filled, water reaches sensor 28 and pump 18 is reversed. After manifold 10 is pumped clear, a small amount of water remains in tube 36. However, the electrolyte volume is expanded because of heat generated during recharging and battery gases trapped within the electrodes. Upon standing, thermal contraction and gas diffusion reduce the electrolyte volume, thereby draining tube 36 and clearing end 38 to allow gases to vent into manifold 10.

Manifold assembly 10 also comprises a plurality of flame arrestors 48 located between filling devices 34 to prevent an explosive flame ignited in one cell from propagating to and damaging adjacent cells. Flame arrestors 48 are also situated in tube 17 between cells 12 and pump 18 and in tube 23 between the cells and sensor 28 to protect the sensor or pump from flame damage, as well as to protect the cells from a flame ignited near the pump or sensor. Manifold assembly 10 thus comprises filling devices 34, flame arrestors 48 including the arrestors connected to tubes 17 and 23, and tubes 44 connecting the filling devices and flame arrestors, but is not intended to include pump 18 and sensor 28.

Figure 2:
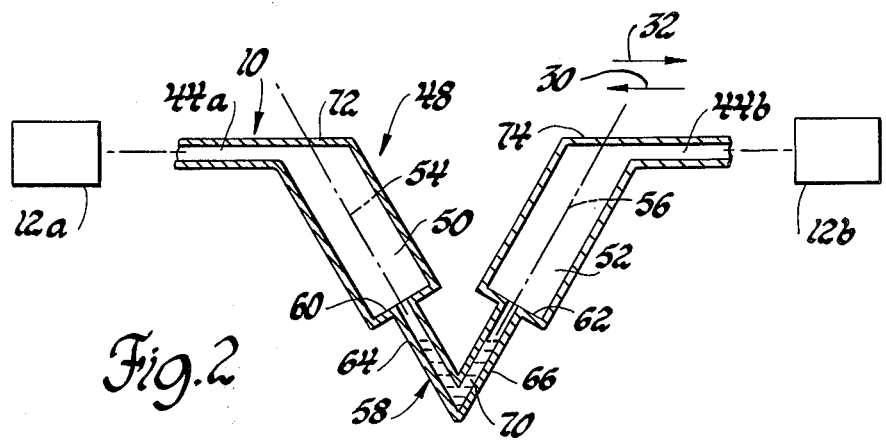
FIG. 2 is a cross-sectional view of a flame arrestor of this invention showing liquid in the trap in the absence of a gas buildup.
Figure 3:
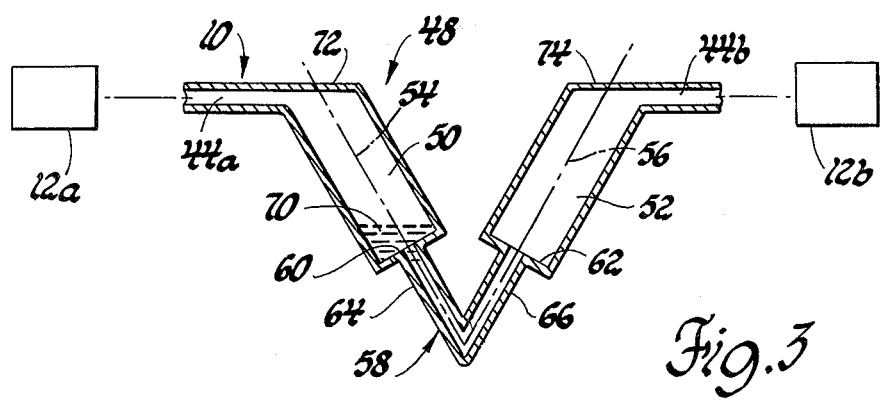
FIG. 3 is a cross-sectional view of the flame arrestor in FIG. 2, but showing liquid displaced from the trap as during venting.

Referring to FIGS. 2 and 3, each flame arrestor 48 comprises two cylindrical chambers 50 and 52 declining from tubes 44a and 44b, respectively, that connect arrestor 48 with appropriate portions of the manifold, for example, cells 12a and 12b, respectively. The chambers have inclined longitudinal axes 54 and 56, respectively, that intersect below transverse lower walls 60 and 62 of the chambers. The chambers are about ¾ inch long and about ⅜ inch in diameter.

A V-shaped liquid strap 58 connects lower walls 60 and 62 of chambers 50 and 52. The trap comprises intersecting hollow arms 64 and 66 coaxial with axes 54 and 56, respectively. Each arm is about ¾ inch long and about ⅛ inch in diameter. The arms open through the lower chamber walls at suitable locations to drain water 70 from the chambers into trap 58 in the absence of a differential gas buildup in the manifold. Trap 58 retains the water 70 so as to impede gas flow, as seen in FIG. 2. Trap 58 has a volume about 2/25 that of either chamber 50 or 52. The diameter of each arm is about 1/5 the diameter of the chamber it opens into. Because of the relative difference in volume and width, gas flow through the trap and upward through either chamber does not purge the chamber of all water, but rather the chamber retains an amount of water sufficient to fill the trap in the absence of gas flow.

Chamber 50 communicates at an upper wall 72 to tube 44a in FIG. 2. Chamber 52 has a similar connection through upper wall 74 to tube 44b. Thus, the fluid flow path through the manifold includes chamber 50, trap 58 and chamber 52.

In the absence of a gas buildup in manifold 10, trap 58 is sealed by liquid 70 with the water level being equal in arms 64 and 66, as depicted in FIG. 2. When battery gases are discharged from cell 12b into manifold 10, or when gases are vented through the manifold to above cell 12b, the gas pressure builds up in tube 44b and thus in chamber 52. The gas buildup forces water 70 from trap 58 into chamber 50 remote from cell 12b, as seen in FIG. 3. Because of the difference in diameters, the flow of water 70 into chamber 50 reduces the water head blocking the gases. When the gas pressure is sufficient to overcome the water head, a burst of gases flow through the trap into chamber 50 and thus into tube 44a. Water displaced from trap 58 by the burst splashes into chamber 50, but is not carried through the chamber because of its relatively large size. The gas escape reduces the pressure in chamber 52 and the water drains into trap 58 to reestablish the seal.

When an explosion is ignited in manifold 10 adjacent cell 12b, the resulting increase in gas pressure temporarily brakes the liquid seal in flame arrestor 48. However, the water 70 has sufficient inertia to quench the flame prior to releasing the gases. Thus, flame arrestor 48 prevents the explosion from spreading, while safely venting gases to reduce the damage to cell 12b. Most probably, the water physically blocks the flame from reaching the explosive gases in chamber 50. It is believed that the gas release through the seal and water drainage to reestablish the seal occur concurrently. As a result, the gases in chambers 50 and 52 are never in direct communication, but are continuously separated by water to protect against an explosion.

It is also an important feature of this invention that flame arrestor 48 does not interfere with filling operations. During cell filling, water 20 is pumped in the direction of arrow 30 through tubes 44 and, more particularly, successively through chamber 52, liquid trap 58 and chamber 50. The chambers and trap are substantially filled with water. After cell filling, pump 18 is reversed to draw excess water through tubes 44 in the direction of arrow 32. As excess water is pumped out, gas is caused to flow through manifold 10. As a result of this gas flow, water is retained in chamber 52 in a manner substantially similar to water retention during venting. This gas flow ceases when pumping is discontinued, whereupon water from the chamber drains into the trap to form the desired seal.

It is apparent that, because of the dual chamber construction, gases can be safely vented through the manifold in either direction. That is, the buildup of gases in the manifold 10 above cell 12a displaces water 70 from trap 58 into chamber 52 and releases gases into tube 44b, while protecting cell 12b from an explosion ignited in cell 12a, in the opposite manner to that described. However, in the described embodiment, normal venting occurs in the direction of arrow 30 through space 24 and catalytic reformer 26. A more significant reason for the dual chamber construction is to permit venting in the direction of arrow 30 and liquid purging in the opposite direction, arrow 32.

The flame arrestor of this invention may be suitably incorporated into manifolds of different design. For example, an alternate venting and filling system may employ a unidirectional pump suitably connected to pump water for filling the cells in one direction and then to draw off excess water in the same direction to purge the manifold for venting. In a system having unidirectional water flow, a flame arrestor having a single chamber located downstream from the trap is suitable.

Although this invention has been described in terms of certain embodiments thereof, it is not intended to be limited to the above description, but rather only to the extent set forth by the claims that follow.

The embodiments of the invention in which an exclusive property or privilege is claimed are defined as follows:

1. In a battery comprising two or more electrochemical cells interconnected by venting means for venting flammable gas from the cells and for occasionally conveying liquid to the cells for replenishing electrolyte therein, the improvement comprising a flame arrestor incorporated into the venting means such that the gas flow path through the venting means is from a first portion through the flame arrestor to a second portion, said flame arrestor comprising a liquid trap comprising first and second conduit arms and a fluid flow connection therebetween, said arms extending generally upward from the connection suitably to trap liquid within the conduit arms about the connection sufficient to temporarily block gas flow therethrough for suppressing flame in the gas, said first arm communicating with said first portion of said venting means to cause gas buildup within said portion to displace liquid into the second arm, a chamber connected to the second liquid trap arm and communicating with said second venting means portion above said second conduit arm to permit gas flow through the chamber from the liquid trap to said second venting means portion, said chamber being suitably connected to said second arm for receiving liquid displaced from the liquid trap by gas buildup with said first portion of said venting means and for draining liquid into the liquid trap in the absence of said gas buildup, said chamber having a fluid flow path cross section larger than the connected conduit arm and a volume greater than said liquid trap to retain liquid within the chamber sufficient to block the trap while permitting gas flow therethrough for venting.

2. In a battery comprising two or more electrochemical cells interconnected by venting means for venting flammable gas from the cells and suitable for occasionally conveying liquid to the cells for replenishing electrolyte therein, the improvement comprising a flame arrestor forming a portion of the fluid flow path through the venting means and comprising a liquid trap comprising a conduit sized and shaped to contain and be temporarily sealed by a quantity of liquid for suppressing a flame attempting to propagate therethrough, and first and second chambers interconnected by said liquid trap and each communicating with a different portion of the venting means such that the fluid flow path through the venting means is sequentially through one chamber, the trap and the other chamber, each chamber being connected to the liquid trap and communicating with a portion of the venting means above said connection to the trap to permit gas flow through the chamber, each said chamber being suitably connected to the trap for receiving liquid displaced from the trap by gas buildup in a remote portion of the venting means and for draining liquid into the trap in the absence of said remote gas buildup, each chamber being sized and shaped effective to retain said trap-sealing quantity of liquid despite the flow of venting gas from the trap through the chamber and for thereafter returning said quantity of liquid to the trap for reestablishing a flame-suppressing seal.

3. In a battery comprising two or more electrochemical cells interconnected by venting means for venting flammable gas from the cells and for occasionally conveying liquid to the cells for replenishing electrolyte therein, the improvement comprising a flame arrestor incorporated into the venting means and comprising a liquid trap comprising first and second conduit arms and a fluid flow connection therebetween, said arms extending generally upward from said connection to suitably trap liquid within the conduit arms about the connection to temporarily block gas flow through the trap for suppressing flame in the gas, and first and second chambers interconnected by the liquid trap and communicating with different portions of the venting means such that the fluid flow path through the venting means is sequentially from a first portion, through the first chamber, the first and second liquid trap arms and the second chamber to a second portion, each chamber comprising a lower opening and an upper opening for permitting fluid flow therethrough, each chamber lower opening connecting to one of said arms above the interarm connection and being suitable for receiving liquid displaced from the arm by gas buildup in the remote portion of the venting means and for draining liquid into the arm in the absence of said remote gas buildup, each chamber having a diameter greater than the connected arm such that liquid displacement into the chamber from the arm reduces liquid pressure blocking gas flow through the liquid trap to facilitate gas flow for venting and having a volume effective to retain liquid despite gas flow from the trap through the chamber in sufficient quantity to block the liquid trap, whereby the flame arrestor permits gas flow through the venting means between the first and second portions in either direction while retaining flame-suppressing liquid therein.

* * * * *